| United States Patent [19] | [11] 3,853,834 |
|---|---|
| Shields | [45] Dec. 10, 1974 |

[54] 4-ALANINE LH-RH ANALOG

[75] Inventor: James E. Shields, Indianapolis, Ind.

[73] Assignee: Eli Lilly and Company, Indianapolis, Ind.

[22] Filed: Oct. 19, 1972

[21] Appl. No.: 298,967

[52] U.S. Cl. .............................. 260/112.5, 424/177
[51] Int. Cl. ..................... C07c 103/52, A61k 27/00
[58] Field of Search .................................. 260/112.5

[56] References Cited
OTHER PUBLICATIONS

Baba et al., J. Biol. Chem., 246, 7581–7585, (1971).

Chang et al., J. Med. Chem., 15, 623–627, (1972).

*Primary Examiner*—Lewis Gotts
*Assistant Examiner*—Reginald J. Suyat
*Attorney, Agent, or Firm*—William C. Martens, Jr.; Everet F. Smith

[57] ABSTRACT

An analog of LH-RH having the formula PyroGlu—His—Trp—Ala—Tyr—Gly—Leu—Arg—Pro—Gly—NH$_2$ as well as its pharmaceutically acceptable acid addition salts exhibit luteinizing hormone release activity and are useful in stimulating fertility in humans and synchronizing estrous in farm animals.

6 Claims, No Drawings

4-ALANINE LH-RH ANALOG

BACKGROUND AND SUMMARY OF THE INVENTION

The release of luteinizing hormone (LH) from the anterior pituitary gland is regulated by the hypothalamus by means of a substance designated alternatively as luteinizing hormone releasing hormone (LH—RH) or releasing factor (LH—RF). For purposes of clarity and consistency, the term "LH—RH" will be employed from this point forward and throughout when referring to this substance. Recently [H. Matsuo, Y. Baba, R. M. G. Nair, A. Arimura, and A. V. Schally, Biochem. Biophys. Res. Commun., 43, 1334 (1971)], it has been established that LH-RH has the following structure:

PyroGlu-His-Trp-Ser-Tyr-Gly-Leu-Arg-Pro-Gly-NH$_2$
   1    2    3    4   5   6   7    8   9  10

A new decapeptide amide has been discovered which exhibits luteinizing hormone release activity and it is to this compound as well as its pharmaceutically acceptable acid addition salts that this invention is directed.

Thus, this invention is directed to a compound of the formula

L—PyroGlu—L—His—L—Trp—L—Ala—L—Tyr—Gly—L—Leu—L—Arg—L—Pro—Gly—NH$_2$ and its pharmaceutically acceptable acid addition salts.

This invention is also directed to novel compounds useful as intermediates in the preparation of the LH—RH analogs of this invention, and include:

a compound of the formula

R$_1$—L—Alla—L—Tyr(R$_2$)—Gly(R)

in which R is methyl, ethyl, p-nitrobenzyl, or benzyl; R$_2$ is t-butyl, benzyl, or 2,6-dichlorobenzyl; and, when R$_2$ is t-butyl, R$_1$ is H- or CBz-; and, when R$_2$ is benzyl or 2,6-dichlorobenzyl, R$_1$ is H—, CBz—, AdOC—, BOC—, or AOC—; or an acid addition salt of those compounds in which R$_1$ is H—; and a compound of the formula R$_1$—L—Trp—L—Ala—L—Tyr(R$_2$)—Gly(R)

in which R is hydrogen, methyl, ethyl, p-nitrobenzyl, or benzyl; R$_2$ is t-butyl, benzyl, or 2,6-dichlorobenzyl; and, when R$_2$ is t-butyl, R$_1$ is H—, CBz—, or (AdOC)$_2$—L—His—; and, when R$_2$ is benzyl or 2,6-dichlorobenzyl, R$_1$ is H—, CBz—, AdOC—, BOC—, AOC—, or (AdOC)$_2$—L—His—; or an acid addition salt of those compounds in which R$_1$ is H—.

DETAILED DESCRIPTION OF THE INVENTION

The LH—RH analogs of this invention can be prepared by a systematic building of the particular peptide sequence. One method which is available can be illustrated by the following scheme:

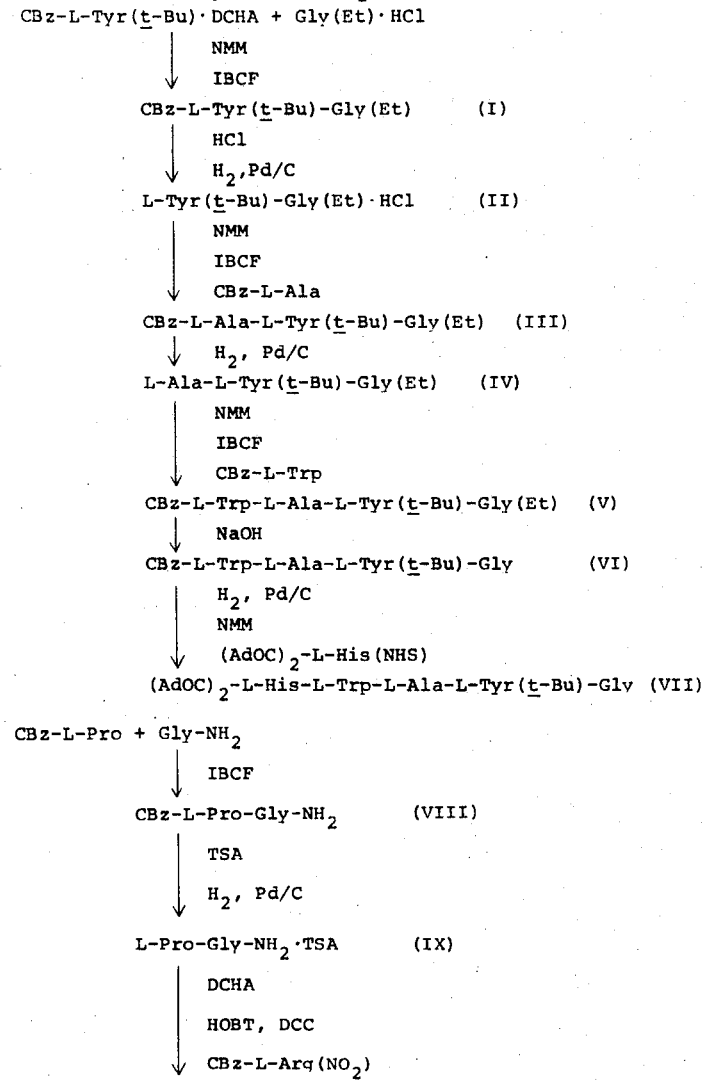

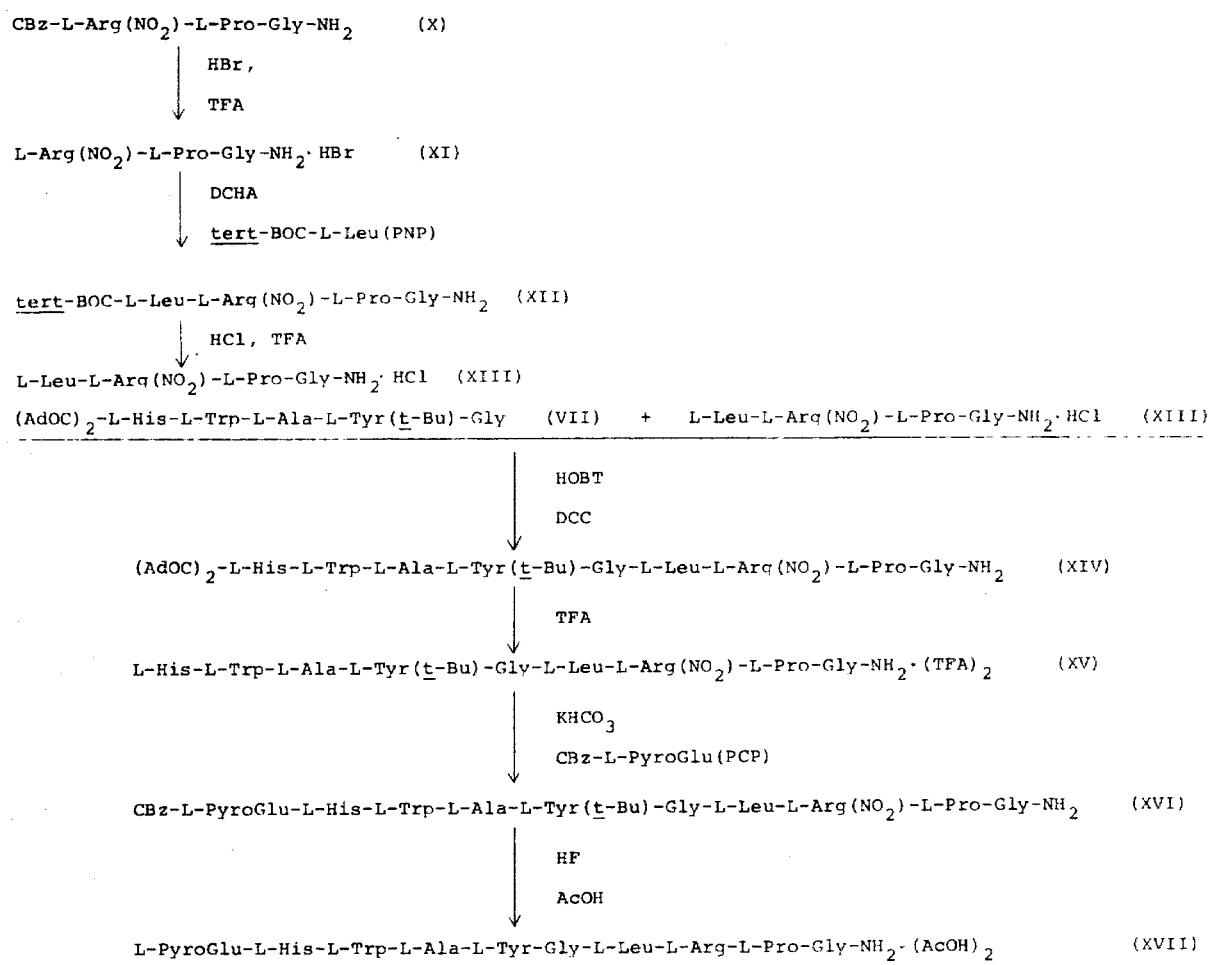
An alternate method of preparing the analogs of this invention can be illustrated by the following scheme:
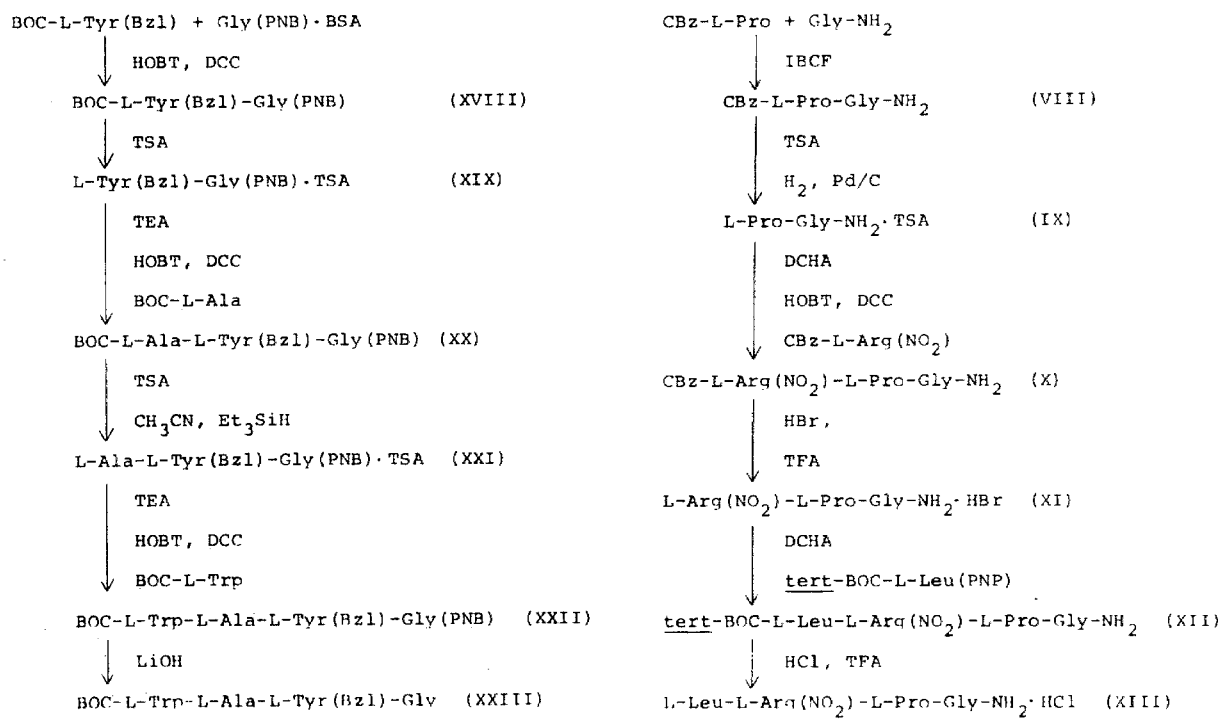

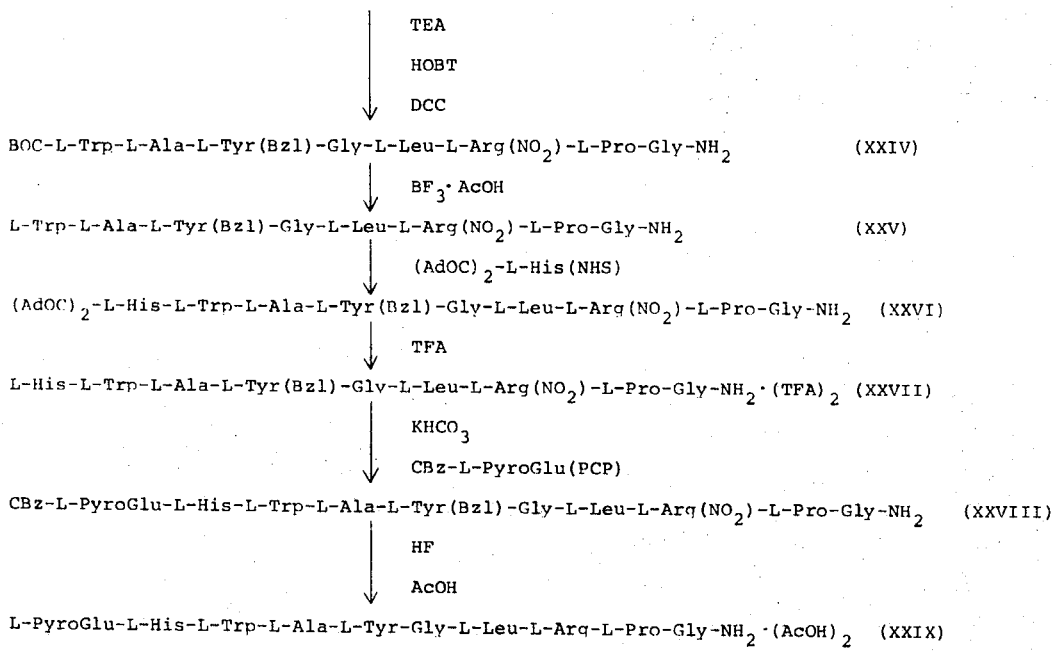

The man skilled in the art will well recognize that various modifications to the above delineated scheme can be made without departing from the spirit of the teaching. Such modifications include, for example, the interchangeability of recognized protecting groups as well as the use of particular methods of peptide coupling and deblocking.

In the specification and claims, the following abbreviations, most of which are well known and commonly used in the art, are employed:

| | |
|---|---|
| Ala | Alanine |
| Arg | Arginine |
| Gly | Glycine |
| His | Histidine |
| Leu | Leucine |
| Pro | Proline |
| PyroGlu | Pyroglutamic acid |
| Trp | Tryptophan |
| Tyr | Tyrosine |
| CBz | Benzyloxycarbonyl |
| BOC | tert-Butyloxycarbonyl |
| AOC | tert-Amyloxycarbonyl |
| t-Bu | tert-Butyl |
| Bzl | Benzyl |
| Et | Ethyl |
| Me | Methyl |
| BSA | Benzenesulfonic acid |
| TSA | p-Toluenesulfonic acid |
| TFA | Trifluoroacetic acid |
| AdOC | Adamantyloxycarbonyl |
| NHS | N-Hydroxysuccinimido |
| HOBT | 1-Hydroxybenzotriazole |
| DCC | N,N'-dicyclohexylcarbodiimide |
| DCB | 2,6-Dichlorobenzyl |
| IBCF | Isobutyl chloroformate |
| DCHA | Dicyclohexylamine |
| TEA | Triethylamine |
| PNP | p-Nitrophenyl |
| PNB | P-Nitrobenzyl |
| PCP | Pentachlorophenyl |
| NMM | N-Methylmorpholine |
| AcOH | Acetic acid |

The synthesis of the LH—RH analogs involves coupling of amino acids or peptide fragments by reaction of the carboxyl function of one with the amino function of another to produce an amide linkage. In order to realize the coupling, it is essential, first, that all reactive functionalities not participating directly in the reaction be inactivated by appropriate blocking groups, and, secondly, that the carboxyl function which is to be coupled be appropriately activated to permit coupling to proceed. All of this involves a careful selection of both reaction sequence and reaction conditions as well as utilization of specific blocking groups so that the desired ultimate peptide will be realized. Each of the amino acids employed to produce the analogs of this invention and having the particularly selected protecting groups and/or activating functionalities is prepared by employing techniques well recognized in the peptide art.

Specific blocking groups are employed at each point in the total synthesis of the LH—RH analogs of this invention. These particular blocking groups have been found to function most smoothly although other groups would indeed operate satisfactorily in the total synthesis although perhaps with lesser efficiency. Thus, for example, benzyloxycarbonyl, t-butyloxycarbonyl, t-amyloxycarbonyl, p-methoxybenzyloxycarbonyl, and adamantyloxycarbonyl can be variously employed as N-blocking groups at selected points in the synthesis. Furthermore, tert-butyl is employed as the hydroxy-protecting group even though others, such as a benzyl or 2,6-dichlorobenzyl group, could well be employed.

In rendering the carboxyl function active to the coupling reaction, at least two separate well recognized techniques are employed at various points in the total synthesis approach in preparing the analogs of this invention. One such activation technique which is employed at particular points in the synthesis involves the conversion of the carboxyl function to a mixed anhydride. The free carboxyl function is activated by reaction with another acid, typically a derivative of carbonic acid, such as an acid chloride thereof. Examples of acid chlorides used to form mixed anhydrides are ethyl chloroformate, phenyl chloroformate, sec-butyl chloroformate, isobutyl chloroformate, pivaloyl chloroformate, and the like.

Another method of activating the carboxyl function for the coupling reaction is by conversion to its active ester derivative. Such active esters include, for example, a 2,4,5-trichlorophenyl ester, a pentachlorophenyl ester, a p-nitrophenyl ester, an ester formed from 1-hydroxybenzotriazole, and an ester formed from N-hydroxysuccinimide.

The carboxyl blocking groups used in preparing the analogs of this invention can be any of the typical esterforming groups, including, for example, $C_1$–$C_4$ alkyl, such as methyl, ethyl, and tert-butyl, benzyl, p-nitrobenzyl, p-methoxybenzyl, 2,2,2-trichloroethyl, and the like. These can be readily removed by alkaline saponification. Relatively strong alkaline conditions, typically an alkaline metal hydroxide, such as sodium hydroxide, potassium hydroxide, lithium hydroxide, and the like, are generally employed to deesterify the protected carboxyl under reaction conditions well recognized in the art. Highly preferred for use is lithium hydroxide. In those instances in which the carboxyl blocking group is p-nitrobenzyl, deblocking can be accomplished by reduction in the presence of zinc and hydrochloric acid.

The nitrogen blocking groups are cleaved in the presence of acid such as HBr, HCl, trifluoroacetic acid, p-toluenesulfonic acid, benzenesulfonic acid, naphthylenesulfonic acid, acetic acid, and the like, to form the respective acid addition salt products. The cleavage can also be accomplished by hydrogenation in the presence of a catalyst such as palladium on carbon. Since this latter method may result in cleavage of more than merely the intended N-blocking group, its use remains rather limited. Another method which is available for accomplishing cleavage of the nitrogen blocking group involves the use of boron trifluoride. For example, boron trifluoride diethyl etherate in glacial acetic acid will convert the nitrogen-protected peptide to a $BF_3$ complex which then can be converted to the deblocked peptide by treatment with base, such as aqueous potassium bicarbonate.

Cleavage of the blocking groups present on the final intermediate to obtain the LH—RH analog can be accomplished by hydrogenation in the presence of a catalyst, typically palladium on carbon, and an acid suitable for formation of a pharmaceutically acceptable salt. Such acids include, for example, inorganic acids, such as HCl, HBr, and the like, organic acids, such as carboxylic acids, including acetic acid, propionic acid, and the like, sulfonic acids, including p-toluenesulfonic acid, benzenesulfonic acid, naphthalene-sulfonic acid, and the like. Cleavage can also be accomplished by treating the intermediate with liquid HF in the presence of anisole and a sulfide, such as methyl ethyl sulfide, evaporating the excess HF, dissolving the product in a solution of the selected pharmaceutically acceptable acid, and lyophilizing to produce the pharmaceutically acceptable acid addition salt of the LH—RH analog. The LH—RH analog can be isolated in the form of its free base, although it is preferred that it be isolated as a pharmaceutically acceptable acid addition salt.

The particular methods of coupling, blocking, and cleavage employed in preparing the analogs of this invention are each now well recognized in the art. The conditions under which a particular coupling, blocking, or cleavage reaction would be carried out will be apparent to those skilled in the art.

Illustrative of the compounds which are a part of this invention and which are useful as intermediates in the preparation of the analogs of this invention are the following:

H—L—Ala—L—Tyr(t—Bu)—Gly(Me)·HBr;
H—L—Ala—L—Tyr(Bzl)—Gly(Bzl)·AcOH;
H—L—Ala—L—Tyr(t-Bu)—Gly(Et);
H—L—Ala—L—Tyr(DCB)—Glyc(PNB);
CBz—L—Ala—L—Tyr(t-Bu)—Gly(Et);
AOC—L—Ala—L—Tyr(Bzl)—Gly(PNB);
BOC—L—Ala—L—Tyr(Bzl)—Gly(Et);
AdOC—L—Ala—L—Tyr(Bzl)—Gly(Me);
CBz—L—Trp—L—Ala—L—Tyr(t—Bu)—Gly(Et);
CBz—L—Trp—L—Ala—L—Tyr(Bzl)—Gly(PNB);
BOC—L—Trp—L—Ala—L—Tyr(DCB)—Gly;
AOC—L—Trp—L—Ala—L—Tyr(Bzl)—Gly;
H—L—Trp—L—Ala—L—Tyr(t—Bu)—Gly; f
H—L—Trp—L—Ala—L—Tyr(Bzl)—Gly;
H—L—Trp—L—Ala—L—Tyr(DCB)—Gly;
$(AdOC)_2$—L—His—L—Trp—L—Tyr(t—Bu)—Gly;
$(AdOC)_2$—L—His—L—Trp—L—Tyr(Bzl)—Gly;
$(AdOC)_2$—L—His—L—Trp—L—Tyr(DCB)—Gly;
and the like.

The activity of the LH—RH analog of this invention is determined by placing hemisected anterior pituitaries, removed from mature diestrous female rats, into 20 ml. flasks each containing 3 ml. of commercially available Medium 199. Two pituitary halves are placed into each of two flasks, and the two flasks comprise a paired-flask unit. One flask serves as the control, and the analog is added to the other flask. Before addition of any analog the pituitaries are preincubated in 3 ml. of Medium 199 for 1 hour at 37° C. in a Dubnoff metabolic shaker. At the end of 1 hour the preincubation medium is discarded, fresh medium is added to the control flask, and fresh medium with analog is added to the experimental flask. All volumes are 3.0 ml. The flask pairs are incubated for an additional 2 hours, whereupon the medium in each is collected and assayed for LH by radioimmunoassay. Fresh medium and analog are added as before and the flasks are incubated for an additional 0.5 hr. The medium in each flask is then again collected and assayed for LH.

Due to their LH release activity, the analogs of this invention can be used to stimulate fertility in humans and additionally can be employed in the synchronization of estrous in farm animals. Administration of the LH—RH analogs can be orally or parenterally. In oral administration a timed release is preferred to assure that the analog reaches the intestine intact. Administration can also be by any of the other usual routes, including, for example, intraperitoneal, intramuscular, subcutaneous, and sublingual.

Generally, the analog will be administered to a female subject in a single does or multiple cumulative doses in an amount sufficient to achieve release of LH which in turn will induce ovulation at an appropriate predetermined time The dose level is such as is sufficient to achieve release of LH at the level desired and generally will be from about 0.01 to about 100 micrograms.

The following examples are provided for the purpose of illustrating the preparation and activity of the analogs of this invention and are not intended to be limiting upon the scope thereof.

EXAMPLE 1

Benzyloxycarbonyl-O-t-butyl-L-tyrosyl-glycine, ethyl ester (1)

A mixture of 3.49 g. (25 mmoles) of glycine ethyl ester hydrochloride in 50 ml. of N,N-dimethylformamide was cooled in an ice-ethanol bath. To the mixture were added 2.75 ml. (25 mmoles) of N-methylmorpholine with continued cooling and stirring.

A suspension of 15.0 g. (27.15 mmoles) of benzyloxycarbonyl-O-t-butyl-L-tyrosine dicyclohexylamine salt in 350 ml. of ethyl acetate was washed twice with 100 ml. of 10 percent aqueous citric acid solution, once with 100 ml. of 410 percent aqueous sodium chloride solution, and once with 100 ml. of water. The ethyl acetate phase was dried over sodium sulfate, filtered, and the resulting filtrate was concentrated in vacuo. The residual oil was dissolved in 60 ml. of N,N-dimethylformamide and cooled in an ice-ethanol bath. To this cold solution were added 2.99 ml. (27.15 mmoles) of N-methylmorpholine and 3.53 ml. (27.15 mmoles) of isobutyl chloroformate. THe mixture was allowed to stir for 15 minutes and then added to the glycine ethyl ester hydrochloride mixture. The resulting mixture was maintained at −16° C. for 28 hours.

The mixture was brought to 0° C., and 7 ml. of 1N sodium bicarbonate solution were added. The mixture was stirred at 0° C. for 1 hour and then added to 1,000 ml. of cold 90 percent saturated sodium chloride solution with vigorous stirring. The resulting product was stored overnight at 5° C., collected by filtration, and washed successively with 10 percent citric acid solution, water, 10 percent sodium chloride solution, and water. The product was dried in vacuo over potassium hydroxide; yield, 10.0 g. (87 percent), m.p. 67°–69° C., $[\alpha]_D^{25} = -3.0°$ (c. = 1.64, TFE).

Anal. Calcd. for $C_{25}H_{32}N_2O_6$:
C, 65.77; H, 7.06; N, 6.14; O, 21.03.
Found: C, 65.65; H, 7.04; N, 5.86; O, 21.61.
Amino Acid Analysis: $Tyr_{0.98}$ $Gly_{1.0}$.

EXAMPLE 2
O-t-butyl-L-tyrosyl-glycine, ethyl ester hydrochloride (II)

To a solution of 4.566 g. (10 mmoles) of I in 50 ml. of methanol was added 1 g. of 5 percent palladium on carbon (Pd/C) which had been moistened with acetic acid. Hydrogen was bubbled through the mixture for 4 hours, at the end of which time carbon dioxide evolution had ceased (as determined using a barium hydroxide trap). To the mixture were added 10 ml. of 1N methanolic hydrochloric acid. The mixture was filtered, and the filtrate was analyzed by thin layer chromatography. Each of two different systems indicated the product (II) to be one spot material:

|  | System A | System B |
| --- | --- | --- |
| $R_f$ of I | 0.883 | 0.833 |
| $R_f$ of II | 0.611 | 0.591 |

System A: Chloroform/Methanol/Acetic Acid (75:24:1)
System B: Tetrahydrofuran/Cyclohexane/Water (93:7:10)

EXAMPLE 3
Benzyloxycarbonyl-L-alanyl-O-t-butyl-L-tyrosyl-glycine, ethyl ester (III)

The methanolic solution of II from Example 2 was concentrated in vacuo. The residual syrup was dissolved in 50 ml. of N,N-dimethylformamide. The solution was cooled in an ice-ethanol bath, and 1.1 ml. (10 mmoles) of N-methylmorpholine were added. The resulting solution was stirred with cooling.

A solution of 2.464 g. (11 mmoles) of benzyloxycarbonyl-L-alanine in 40 ml. of N,N-dimethylformamide was cooled in an ice-ethanol bath. To this solution were added 1.21 ml. (11 mmoles) of N-methylmorpholine and 1.43 ml. (11 mmoles) of isobutyl chloroformate. The resulting mixture was stirred for 15 minutes in the cooling bath and then added to the neutralized solution of the hydrochloride (II). The mixture was maintained for 16.5 hours at −16° C.

The reaction mixture was then brought to 0° C., and 3 ml. of 1N sodium bicarbonate solution were added. The mixture was stirred at 0° C. for 1 hour and then added dropwise to 500 ml. of cold, 90 percent saturated aqueous sodium chloride solution with vigorous stirring. The product was oily and was extracted into 350 ml. of hot ethyl acetate. The resulting insoluble material was removed by filtration. The ethyl acetate phase was then successively washed twice with 50 ml. of 10 percent citric acid solution, once with 50 ml. of water, twice with 50 ml. of 1N sodium bicarbonate solution, and twice with 50 ml. of water. The ethyl acetate phase was dried over sodium sulfate and filtered. The filtrate was concentrated in vacuo to give a solid which was collected with ether and dried in vacuo. Yield; 3.33 g. (63 percent, based on I), m.p. 140.5°–142° C., $[\alpha]_D^{25} = -49.3°$ (c. = 0.65, TFE).

Anal. Calcd. for $C_{28}H_{37}N_3O_7$:
C, 63.74; H, 7.07; N, 7.96; O, 21.23.
Found: C, 63.63; H, 7.32; N, 7.99; O, 21.30.
Amino Acid Analysis: $Ala_{1.0}$ $Tyr_{0.95}$ $Gly_{1.0}$.

| TLC: | System A | System B |
| --- | --- | --- |
| $R_f$ (III) | 0.849 | 0.816 |

System A: Chloroform/Methanol/Acetic Acid (75:24:1)
System B: Tetrahydrofuran/Cyclohexane/Water (93:7:10)

EXAMPLE 4
Alanyl-O-t-butyl-L-tyrosyl-glycine, ethyl ester (IV)

To a solution of 3.166 g. (6 mmoles) of III in 100 ml. of methanol was added 0.6 g. of 5 percent Pd/C which had been moistened with acetic acid. Hydrogen was bubbled through the mixture for 1¾ hours, at the end of which time carbon dioxide evolution had ceased (as determined using a barium hydroxide trap). The catalyst was filtered, and the filtrate was analyzed by thin layer chromatography. Each of two solvent systems developed one spot and indicated the absence of starting material:

|  | System A | System B |
| --- | --- | --- |
| $R_f$ of III | 0.838 | 0.777 |
| $R_f$ of IV | 0.465 | 0.424 |

System A: Chloroform/Methanol/Acetic Acid (75:24:1)
System B: Tetrahydrofuran/Cyclohexane/Water (93:7:10)

EXAMPLE 5
Benzyloxycarbonyl-L-tryptophyl-L-alanyl-O-t-butyl-L-tryosyl-glycine, ethyl ether (V)

The methanolic solution of IV from Example 4 was concentrated in vacuo. The residual oil was dissolved in 25 ml. of N,N-dimethylformamide and cooled in an ice-ethanol bath.

A solution of 2.369 g. (7 mmoles) of benzyloxycarbonyl-L-tryptophan in 25 ml. of N,N-dimethylformamide was cooled in an ice-ethanol bath. To this solution were added 0.77 ml. (7 mmoles) of N-methylmorpholine and 0.91 ml. (7 mmoles) of isobutyl chloroformate. The mixture was stirred for 15 minutes in the cooling bath and then was added to the cold solution of IV. The resulting mixture was maintained at −16° C. for 19.5 hours.

The reaction mixture was then brought to 0° C. To the mixture were added 2 ml. of 1N sodium bicarbonate solution. The mixture was stirred at 0° C. for 1 hour. The solution was then added dropwise with stirring to 300 ml. of cold, 90 percent saturated sodium chloride solution. The product was maintained at 5° C. and then collected by filtration and washed successively with 10 percent citric acid solution, water, 1N sodium bicarbonate solution, and water. The product was dried in vacuo over phosphorus pentoxide; yield, 3.99 g. (93 percent, based on III), m.p. 120°–122° C. (dec.), $[\alpha]_D^{25} = -12.8°$ (c. = 1.06, TFE).
Anal. Calcd. for $C_{39}H_{47}N_5O_8$:
C, 65.62; H, 6.64; N, 9.81; O, 17.93.
Found: C, 65.78; H, 6.59; N, 9.58; O, 17.69.
Amino Acid Analysis: $Trp_{0.99}$ $Ala_{0.98}$ $Tyr_{0.99}$ $Gly_{1.0}$.

| TLC: | System A | System B |
| --- | --- | --- |
| $R_f$ (V) | 0.892 | 0.771 |

System A: Chloroform/Methanol/Acetic Acid (75:24:1)
System B: n-butanol/Acetic Acid/Water/Pyridine (30:6:24:20)

EXAMPLE 6

Benzyloxycarbonyl-L-tryptophyl-L-alanyl-O-t-butyl-L-tyrosyl-glycine (VI)

In a mixture of 50 ml. each of dioxane and water were suspended 3.569 g. (5mmoles) of V. To the resulting mixture were added 5.25 ml. (5.25 mmoles) of 1N sodium hydroxide solution. The resulting mixture was stirred at room temperature for 18.5 hours, during which time solution was achieved. The solution was stirred, and 0.25 ml. of 1N hydrochloric acid was added, the pH of the mixture being 6.93. The pH of the solution was reduced to 3.5 by addition of 10 percent citric acid solution. Water was then added dropwise, and the product precipitated as an oil. An attempted crystallization from 95 percent ethanol failed. The product was allowed to stand at room temperature overnight under ether, and crystallization resulted. The product was collected, washed with ether, and dried in vacuo; yield, 1.833 g. (54 percent), m.p. 128.5°–132°C. (dec.)., $[\alpha]_D^{25} = -14.7°$ (c. = 0.59, TFE).
Anal. Calcd. for $C_{37}H_{45}N_5O_8$:
C, 64.61; H, 6.59; N, 10.18; O, 18.61.
Found: C, 64.30; H, 6.60; N, 10.38; O, 18.81

| TLC: | System A | System B |
| --- | --- | --- |
| $R_f$ of V | 0.902 | 0.843 |
| $R_f$ of VI | 0.524 | 0.741 |

System A: Chloroform/Methanol/Acetic Acid (75:24:1)
System B: Tetrahydrofuran/Cyclohexane/Water (93:7:10)

EXAMPLE 7

$N^\alpha$, $N^{IM}$-Diadamantyloxycarbonyl-L-histidyl-L-tryptophyl-L-alanyl-O-t-butyl-L-tyrosyl-glycine (VII)

To a solution of 1.376 g. (2 mmoles) of VI in 15 ml. of methanol was added 0.2 g. of 5 percent Pd/C which had been moistened with water. Hydrogen was passed through the mixture at room temperature for 3 hours after which carbon dioxide evolution had ceased (as determined by a barium hydroxide trap). The product had become insoluble in methanol and thus inseparable from the catalyst. 2 ml. of 1N hydrochloric acid were added with swirling and gentle heating. Solution of the product occurred. The catalyst was then filtered. The filtrate was concentrated in vacuo, and the residue was azeotroped with isopropanol and concentrated in vacuo. This procedure was repeated.

The resulting residue was dissolved in a minimum of N,N-dimethylformamide, and 0.224 ml. (2 mmoles) of N-methylmorpholine was added. A precipitate of N-methylmorpholine hydrochloride immediately appeared. To this mixture were added 1.340 g. (2.2 mmoles) of $N^\alpha$, $N^{IM}$-diadamantyloxycarbonyl-L-histidine N-hydroxysuccinimide ester in 5 ml. of N,N,-dimethylformamide. The mixture was maintained at room temperature for 88 hours, during which time solution occurred. The product (VII) was precipitated by slowly adding 150 ml. of water. The mixture was cooled to 5° C., and the product was collected, washed with water, and dried in vacuo over sodium hydroxide. Thin layer chromatography showed the presence of some $N^\alpha$, $N^{IM}$-diadamantyloxycarbonyl-L-histidine N-hydroxysuccinimide ester. Recrystallization was effected from 95 percent ethanol using some water. The product was again collected with addition of water and dried in vacuo over sodium hydroxide; yield, 1.701 g. (81 percent), m.p. 158°C. (dec.), $[\alpha]_D^{25} = -4.0°$ (c. = 1.13, TFE).
Amino Acid Analysis: $His_{1.37}$ $Trp_{0.75}$ $Ala_{0.98}$ $Tyr_{0.94}$ $Gly_{1.0}$.

EXAMPLE 8

Benzyloxycarbonyl-L-prolyl-glycinamide (VIII)

Benzyloxycarbonyl-L-proline (97.75 g., 0.391 mole) was dissolved in 200 ml. of DMF, cooled to −15° C., and 50.3 ml. (0.387 mole) of isobutyl chloroformate and 42.5 ml. (0.387 mole) of N-methylmorpholine were added. After 5 minutes, a suspension of glycinamide [made by suspending 43.1 g. (0.391 mole) of glycinamide hydrochloride in 200 ml. of DMF, cooling to −15° C., and adding 43 ml. (0.391 mole) of N-methylmorpholine] was added. The reaction mixture was stirred 2–3 hours at −15°C., and then allowed to warm to room temperature overnight with stirring. The reaction mixture was filtered, and the filtrate was evaporated in vacuo. The residue was azeotroped with toluene, dissolved in 400 ml. of hot water, treated with activated carbon and filtered. After cooling to room temperature, crystallization occurred. After cooling overnight at 4° C., the product was filtered. A second recrystallization from hot water gave 64.95 g. (55 percent), m.p. 137°–142° C.
Elem. Anal. Calcd. for $C_{15}H_{20}N_3O_4$:
C, 58.81; H, 6.58; N, 13.72; O, 20.89.
Found: C, 58.94; H, 6.30; N, 13.71; O, 20.91.

EXAMPLE 9

$N^\alpha$-Benzyloxycarbonyl-G-nitro-L-arginyl-L-propylglycinamide (X)

A solution of 31.2 g. (0.102 mole) of benzyloxycarbonyl-L-prolyl-glycinamide and 19.38 g. (0.102 mole) of p-toluenesulfonic acid monohydrate in 100 ml. of DMF/MeOH (1:1) was hydrogenated for 12 hours in the presence of 4.0 g. of 5 percent palladium on carbon. The catalyst was removed by filtration, the filtrate evaporated in vacuo to dryness, and the residue azeotroped four times with benzene. The residue was dissolved in 300 ml. of DMF, cooled to 0° C., and 20.1 ml. (0.102 mole) of N,N-dicyclohexylamine, 13.77 g. (0.102 mole) of N-hydroxybenzotriazole, and 23.1 g. (0.112 mole) of N,N'-dicyclohexylcarbodiimide were added. After the solution was stirred for 10 minutes at 0° C., 44.3 g. (0.1255 mole) of $N^\alpha$-benzyloxycarbonyl-G-nitroarginine were added, and the reaction mixture was stirred mechanically for 18 hours, gradually warming to room temperature during that period. The precipitated solids were removed from the reaction mixture by filtration, and the filtrate was diluted with water to the cloud point. Ethanol was added to clear the solution. The solution was treated with sufficient Amberlite MB-1 ion exchange resin (in 100 ml. portions of resin in 20 percent aqueous ethanol) to remove 1-hydroxybenzotriazole and other ionic species. The resin batches were washed thoroughly with 20 percent aqueous ethanol. The washings were combined with the filtrate, and the filtrate was evaporated to dryness in vacuo. The residue was dissolved in hot tetrahydrofuran with addition of a minimum volume of methanol to ensure solution. Precipitation with ethyl acetate and filtration after standing in the cold gave 39.89 g. of solid which was chromatographically impure. The solid was triturated with hot water, and the suspension was placed in the cold overnight. The aqueous layer was decanted, and the residue was dissolved in methanol. Evaporation of the solvent in vacuo, and the resolution of the residue in hot tetrahydrofuran, followed by reprecipitation with ethyl acetate gave an amorphous solid; yield 35.6 g. (69 percent).

Anal. Calcd for $C_{13}H_{26}N_8O_5Br$:

C, 49.70; H, 6.16; N, 22.08; O, 22.07.

Found: C, 49.73; H, 5.99; N, 22.12; O, 22.24.

Amino Acid Analysis: $Arg_{0.99}$ $Pro_{1.00}$ $Gly_{1.01}$.

EXAMPLE 10

G-Nitro-L-arginyl-L-prolyl-glycinamide hydrobromide (XI)

Dry hydrogen bromide was bubbled into a solution of 32.6 g. (0.064 mole) of X in 200 ml. of a mixture of trifluoroacetic acid and anisole (7:1). After 45 minutes, the reaction mixture was diluted to 1 liter with ether, cooled, triturated, and filtered. The precipitated residue was dried in vacuo over KOH pellets. The slightly yellow solid was suspended in 200 ml. methanol, the mixture heated, and 200 ml. of acetonitrile added. The addition of one liter of tetrahydrofuran gave a precipitate which was filtered after 2 hours in the cold and dried in vacuo over KOH pellets. Yield 21.0 g. (70 percent), $[\alpha]_D^{25} = -10.1°$ (c. = 1, MeOH).

Calculated for $C_{13}H_{26}N_8O_5Br$: Br, 17.59.

Found: Br, 23.73.

Amino Acid Analysis Found: $Arg_{0.96}$ $Pro_{1.00}$ $Gly_{1.00}$. $R_f$ 0.10 (n-Butanol-acetic acid-water, 4:1:1).

EXAMPLE 11 t-Butyloxycarbonyl-L-leucyl-G-nitro-L-arginyl-L-prolyl-glycinamide (XII)

To a solution of 20.0 g. (0.0441 mole, calculated on the basis of the bromime analysis) of XI in 150 ml. of N,N-dimethylformamide (DMF) at 0° C. were added 12.2 ml. (0.062 mole) of N,N-dicyclohexylamine (DCHA). Another 50 ml. of DMF was added to facilitate stirring. After addition of 18.65 g. (0.053 moles) of t-butyloxycarbonyl-L-leucine p-nitrophenyl ester, the reaction mixture was stirred 72 hours. The reaction mixture was cooled to 0° C. and filtered to remove DCHA·HBr. The solution was evaporated in vacuo to a residue which was redissolved in ethyl acetate and reprecipitated with ether to give an amorphous solid; yield 17.94 g. (69 percent) after drying in vacuo at 40° C. $[\alpha]_D^{25} = -57.9°$ (c. = 1, MeOH).

Amino Acid Analysis: $Leu_{0.99}Arg_{0.95}Pro_{1.00}Gly_{1.02}$.

EXAMPLE 12

L-Leucyl-G-nitro-L-arginyl-L-prolyl-glycinamide hydrochloride (XIII)

Dry hydrogen chloride was bubbled into a solution of 19.0 g. (0.032 mole) of XII in 50 ml. of acetic acid containing 5 ml. anisole, 5 ml. triethylsilane, and 5 ml. of trifluoroacetic acid. After 30 minutes, the reaction mixture was diluted with ether, and the resulting precipitate was triturated. The product was removed by filtration, dried in vacuo and redissolved in hot ethanol-acetonitrile (1:1). Addition of ether, cooling, and filtration gave an amorphous, hydroscopic precipitate. Yield 16.7 g. (99 percent).

Anal. Calcd for $C_{19}H_{37}O_6Cl$: Cl, 5.96.

Found: Cl, 7.64.

Amino Acid Analysis: $Leu_{0.97}Arg_{0.97}Pro_{1.04}Gly_{1.02}$. $R_f$ 0.28 (n-Butanol-acetic acid-water, 4:1:1), containing a very minor contaminant $R_f$ 0.52. $[\alpha]_D^{25} = -36.9°$ (c. = 1, MeOH).

EXAMPLE 13

$N^\alpha$, $N^{IM}$-diadamantyloxycarbonyl-L-histidyl-L-tryptophyl-L-alanyl-O-t-butyl-L-tyrosyl-glycyl-L-leucyl-G-nitro-L-arginyl-L-prolyl-glycinamide (XIV).

To a solution of 0.523 g. (1 mmole, as determined from the chlorine analysis) of XIII in 10 ml. of N,N-dimethylformamide was added 0.14 ml. (1.25 mmole) of N-methylmorpholine. The mixture was stirred at room temperature for 15 minutes. To the reaction mixture were added 1.047 g. (1 mmole) of $N^\alpha$, $N^{IM}$-diadamantyloxycarbonyl-L-histidyl-L-tryptophyl-L-alanyl-O-t-butyl-L-tyrosyl-glycine (VII) and 0.135 g. (1 mmole) of 1-hydroxybenzotriazole in 5 ml. of N,N-dimethylformamide. The reaction mixture was cooled in an ice-ethanol bath.

A cold solution of 0.227 g. (1.1 mmole) of N,N'-dicyclohexylcarbodiimide in 4 ml. of N,N-dimethylformamide was then added. The mixture was maintained at 5° C. for 112 hours. The dicyclohexylurea which formed was removed by filtration. The product was precipitated from the filtrate by addition of ether and was collected with ether and dried in vacuo; yield, 1.201 g. (79 percent), m.p. 156° C. (dec.), $[\alpha]_D^{25} = -26.2°$ (c. = 0.77, TFE).

Amino Acid Analysis: $His_{0.96}Trp_{0.66}Ala_{0.79}Tyr_{0.80}Gly_{0.76}Leu_{1.0}Arg_{0.99}Pro_{1.06}Gly_{1.0}$.

| TLC: | System A | System B |
|---|---|---|
| $R_f$ of XIV | 0.102 | 0.560 |

System A: Chloroform/Methanol/Acetic Acid (135:15:1)

System B: Tetrahydrofuran/Cyclohexane/Water (140:10:8)

EXAMPLE 14

Benzyloxycarbonyl-L-pyroglutamyl-L-histidyl-L-tryptophyl-L-alanyl-O-t-butyl-L-tyrosyl-glycyl-L-leucyl-G-nitro-L-arginyl-L-prolyl-glycinamide (XVI).

To a solution of 0.758 g. (0.5 mmole) of XIV in 5 ml. of phenol were added 0.08 ml. of mercaptoethanol, 2 ml. of water, and 15 ml. of trifluoroacetic acid. The mixture was stirred at room temperature for 2 hours. The resulting solution was concentrated in vacuo. The residual oil was azeotroped with isopropanol and concentrated in vacuo again. The residue was triturated with ether and stored at −11° C. overnight. The product was filtered and air dried. A thin layer plate run in tetrahydrofuran/cyclohexane/water (140:10:8) indicated one spot product with no starting material (XIV) present. $R_f$ of XIV was 0.607, and $R_f$ of the N-deblocked product (XV) was 0.

The N-deblocked product (XV) was dissolved in 10 ml. of N,N-dimethylformamide, and 8 ml. of 2N potassium bicarbonate solution were added. The mixture was stirred at room temperature for 5 hours. Water was added to dissolve excess salt and to precipitate the neutralized peptide, which was oily. The oil was dissolved in a minimum amount of N,N-dimethylformamide. The resulting insoluble material was filtered, and ether was added to the filtrate. An oily solid resulted which, though chilled at −11° C., remained oily.

The oily solid was dissolved in 5 ml. of N,N-dimethylformamide. To this solution was added 0.257 g. (0.5 mmoles) of the pentachlorophenyl ester of benzyloxycarbonyl-L-pyroglutamic acid in 2 ml. of N,N-dimethylformamide. The reaction mixture was stirred at room temperature for 117 hours. It was then treated with 5 ml. of pyridine and 20 ml. of water, and heated on a steam bath for 15 minutes. Water was added to precipitate the product which was gummy after cooling the reaction mixture to 5° C. the product was recrystallized from N,N-dimethylformamide and ether with cooling at −11° C. The product (XVI) was dried in vacuo; yield, 0.471 g. (67 percent), m.p. 149° C. (dec.), $[\alpha]_D^{25} = -23.9°$ (c. = 0.57, TFE).

Amino Acid Analysis: $PyroGlu_{1.97}His_{0.61}Trp_{0.39}Ala_{0.75}Tyr_{0.92}$
$Gly_{1.0}Leu_{1.08}Arg_{0.77}$ (Ornithine not included) $Pro_{1.13}$-$Gly_{1.0}$.

| TLC: | System A | System B |
|---|---|---|
| $R_f$ XVI | 0.0 | 0.511, 0.123 |

System A: Chloroform/Methanol/Acetic Acid (135:15:1)
System B: Tetrahydrofuran/Cyclohexane/Water (140:10:8)

EXAMPLE 15

L-Pyroglutamyl-L-histidyl-L-tryptophyl-L-alanyl-L-tyrosyl-glycyl-L-leucyl-L-arginyl-L-prolyl-glycinamide diacetate salt (XVII)..

To 0.150 g. (0.107 mmoles) of XVI were added 0.5 ml. each of triethylsilane and ethyl methyl sulfide. The mixture was cooled in liquid nitrogen, and 10 ml. of liquid hydrogen fluoride were added by distillation. The mixture was allowed to warm to 0° C. over 1 hour. The hydrogen fluoride was distilled off, and the residue was triturated with ether. The resulting solid was collected and air dried. It was then dissolved in acetic acid and filtered to remove cloudiness. The filtrate was lyophilized. The processes of solution and lyophilization were repeated.

The solid was then dissolved in 15 ml. of 1N acetic acid. A slight cloudiness resulted. The solution was centrifuged, and the supernatant was chromatographed on a Sephadex G-10 column under the following conditions: solvent, 1N acetic acid (at 4° C.); column size, 2.5 × 90 cm.; flow rate, 55.5 ml./hr.; fraction volume, 18.5 ml.

A plot of absorbance at 280 m$\mu$ of each fraction versus fraction number indicated one broad peak with possibly two shoulders. A collection of three sets of fractions was made.

Fractions combined and their effluent volumes were: Fractions 10–14 (166–259 ml.), Fractions 15–18 (260–333 ml.), Fractions 19–24 (334–444 ml.). Each of the three samples were lyophilized and collected. The weights recorded were 11.2 mg., 7.2 mg., and 2.3 mg. Amino acid analyses indicated the second sample contained product of the highest purity (XVII).

Amino acid analysis:
$PyroGlu_{0.73}His_{0.95}Trp_{0.63}Ala_{1.0}Tyr_{0.94}Gly_{1.0}Leu_{1.13}Arg_{1.1}Pro_{1.1}Gly_{1.1}$.

Assay of the LH-RH Analog

The lyophilized fraction obtained from G-10 Sephadex chromatography was made up in a stock solution, nominally 0.1 mg./ml. by weight.

Amino acid analysis showed 34 nanomoles of decapeptide analog per ml.

At a nominal dose of 50 nanograms (ng.) (5 × 10$^{-4}$ ml. = 17 picomoles of decapeptide analog), LH released at 90 minutes was 475 ng. per mg. of pituitary tissue. This release is equal to that obtained from 3.65 picomoles of natural synthetic LH—RH, or a relative potency of 10.7 percent.

I claim:
1. A compound of the formula

$R_1-L-Ala-L-Tyr(R_2)-Gly(R)$ in which R is methyl, ethyl, p-nitrobenzyl, or benzyl; $R_2$ is t-butyl, benzyl, or 2,6-dichlorobenzyl; and, when $R_2$ is t-butyl, $R_1$ is H— or CBz—; and, when $R_2$ is benzyl or 2,6-dichlorobenzyl, $R_1$ is H—, Cbz—, AdOC—, BOC—, or AOC—; or an acid addition salt of those compounds in which $R_1$ is H-.

2. Compound of claim 1, in which R is ethyl, $R_2$ is t-butyl, and $R_1$ is H— or CBz—.

3. Compound of claim 1, in which R is p-nitrobenzyl, $R_2$ is benzyl, and $R_1$ is H— or BOC—.

4. A compound of the formula

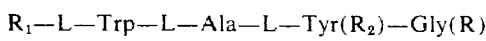

$R_1-L-Trp-L-Ala-L-Tyr(R_2)-Gly(R)$ in which R is hydrogen, methyl, ethyl, p-nitrobenzyl, or benzyl; $R_2$ is t-butyl, benzyl, or 2,6-dichlorobenzyl; and, when $R_2$ is t-butyl, $R_1$ is H-, Cbz-, or (AdOC)$_2$—L—His—; and, when $R_2$ is benzyl or 2,6-dichlorobenzyl, $R_1$ is H—, CBz—, AdOC—, BOC—, AOC—, or (AdOC)$_2$—L—His—; or an acid addition salt of those compounds in which $R_1$ is H—.

5. Compound of claim 4, in which R is hydrogen or ethyl, $R_2$ is t-butyl, and $R_1$ is H—, CBz—, or (AdOC)$_2$—L—His—.

6. Compound of claim 4, in which R is hydrogen or p-nitrobenzyl, $R_2$ is benzyl, and $R_1$ is BOC—.

* * * * *